US010481414B2

(12) United States Patent
Tsai (10) Patent No.: US 10,481,414 B2
(45) Date of Patent: Nov. 19, 2019

(54) INTELLIGENT ASSISTED VISION GLASSES

(71) Applicants:INVENTEC APPLIANCES (PUDONG) CORPORATION, Shanghai (CN); INVENTEC APPLIANCES CORP., New Taipei (TW)

(72) Inventor: Pei-Lun Tsai, New Taipei (TW)

(73) Assignees: INVENTEC APPLIANCES (PUDONG) CORPORATION, Shanghai (CN); INVENTEC APPLIANCES CORP., New Taipei (TW)

( * ) Notice: Subject to any disclaimer, the term of this patent is extended or adjusted under 35 U.S.C. 154(b) by 33 days.

(21) Appl. No.: 15/864,204

(22) Filed: Jan. 8, 2018

(65) Prior Publication Data
US 2018/0335649 A1    Nov. 22, 2018

(30) Foreign Application Priority Data
May 22, 2017    (CN) .......................... 2017 1 0365928

(51) Int. Cl.
*G02C 7/10*    (2006.01)
*G02C 7/08*    (2006.01)
(Continued)

(52) U.S. Cl.
CPC ................. *G02C 7/10* (2013.01); *G02B 7/28* (2013.01); *G02C 7/083* (2013.01); *G02C 7/085* (2013.01); *G02C 11/10* (2013.01)

(58) Field of Classification Search
CPC ........ G02C 7/081; G02C 7/085; G02C 7/022; G02C 7/08; G02C 7/083; G02C 7/10; G02C 11/10; G02B 7/28
(Continued)

(56) References Cited

U.S. PATENT DOCUMENTS

4,026,640 A * 5/1977 Everburg ............... G02C 3/003
351/119
4,403,840 A * 9/1983 Okun ..................... G02C 7/081
351/41
(Continued)

*Primary Examiner* — Jordan M Schwartz
(74) *Attorney, Agent, or Firm* — Muncy, Geissler, Olds & Lowe, P.C.

(57) ABSTRACT

A pair of intelligent assisted vision glasses includes an eyeglass body, the left and right frames respectively having two accommodation rooms with transparent liquid, a set of left eye lenses and a set of right eye lenses respectively in the left and right frames, a microelectromechanical component, a sensor electrically connected with the microelectromechanical component for detecting the axial length of eyeball and the curvature of the cornea to generate control signal, and a pair of push units respectively arranged at upper ends of the left frame and a pair of push units respectively arranged at upper ends of the right frame and each pair of push units is electrically connected with the microelectromechanical component. The microelectromechanical component controls the push units to change the curvature of the set of left and/or right eye lenses according to the controlling signal. The flow volume of the transparent liquid in the voids between the set of left and/or right eye lenses is changed corresponding to the curvature of the set of left and/or right eye lenses.

10 Claims, 8 Drawing Sheets

(51) Int. Cl.
*G02B 7/28* (2006.01)
*G02C 11/00* (2006.01)

(58) Field of Classification Search
USPC ............... 351/159.34, 159.68; 359/665, 666
See application file for complete search history.

(56) References Cited

U.S. PATENT DOCUMENTS

| | | | | |
|---|---|---|---|---|
| 4,547,048 | A * | 10/1985 | Negishi | G02C 5/124 |
| | | | | 351/115 |
| 4,762,407 | A * | 8/1988 | Anger | G02C 5/001 |
| | | | | 351/200 |
| 5,402,109 | A * | 3/1995 | Mannik | G02C 5/001 |
| | | | | 340/575 |
| 8,690,328 | B1 * | 4/2014 | Chong | A61B 3/14 |
| | | | | 351/205 |
| 2009/0164007 | A1 * | 6/2009 | Van Heugten | A61B 3/1005 |
| | | | | 623/6.11 |
| 2012/0019773 | A1 * | 1/2012 | Blum | G02C 7/08 |
| | | | | 351/159.01 |
| 2015/0168744 | A1 * | 6/2015 | Wehrenberg | G02C 7/085 |
| | | | | 351/159.68 |
| 2015/0378067 | A1 * | 12/2015 | Stevens | G02B 3/14 |
| | | | | 359/666 |
| 2017/0146825 | A1 * | 5/2017 | Nottage | G02C 7/088 |
| 2017/0332900 | A1 * | 11/2017 | Li | A61B 3/107 |
| 2019/0011612 | A1 * | 1/2019 | Mastrangelo | G02B 3/14 |

\* cited by examiner

INTELLIGENT ASSISTED VISION GLASSES

CROSS-REFERENCE TO RELATED APPLICATIONS

This application claims priority to China Patent Application No. 201710365928.3, filed May 22, 2017, the content of which are hereby incorporated by reference in their entirety.

FIELD OF THE INVENTION

The present invention relates to a pair of intelligent eyeglasses, and more particularly to a pair of intelligent eyeglasses adaptive to variation of user's near-sighted diopter by adjusting curvature of eyeglass lenses rather than replacing the eyeglass lenses.

BACKGROUND OF THE INVENTION

Most people acquire information with eyes. Once something happen for vision of eye, such as myopia, presbyopic, hyperopia and/or astigmatism, the vision correction is implemented by laser surgery. However, wearing a pair of eyeglasses with specific diopter is popular for most people.

There are various purposes for eyeglasses on market, such as optical eyeglasses, sunglasses, sports glasses or protective eyewear, and so on. Furthermore, lenses for eyeglasses can be divided into nearsighted lens or presbyopic lens, etc. Generally, once user's vision or eye situation changes, such as nearsighted, farsighted or astigmatism diopter increases, user often replace whole pair of wearing eyeglasses that meets user's requirement no longer and possibly causes eye fatigue. However, cost of eyeglasses replacement can cause a burden on user. Furthermore, owning plural pairs of eyeglasses of different diopters or functions is not convenient to user and cause another burden on user, too.

SUMMARY OF THE INVENTION

According to above drawbacks in the conventional prior art, the present invention provides a pair of intelligent assisted vision glasses to adjust moderate diopter of lens adaptive to the changing of user's eyes condition rather than replace a pair of whole eyeglasses or eyeglass lenses.

It is another objective of the invention is to provide a pair of intelligent assisted vision glasses equipped with a sensor is able to detect axial length of user's eye and curvature of user's cornea and further to adjust curvature of lens according to detected data. Consequently, use may still see everything clearly with the intelligent assisted vision glasses even the axial length of user's eye and the curvature of user's cornea vary.

It is an objective of the invention is to provide a pair of intelligent assisted vision glasses equipped with a vision identification device is able to detect convex degree and convex period of lens of user's eyeball, to determine whether user's eyes are overused or not, and to smartly remind use of moderate rest for eyes.

According to above objectives, the present invention provides a pair of intelligent assisted vision glasses, which includes an eyeglass body, a left frame, a right frame and temples pivotally coupled to the left and right frames, an accommodation room with transparent liquid respectively at upper inner side and lower inner side of the left and right frames; a set of left eye lenses engaged with the left frame and a set of right eye lenses engaged with the right frame, each of both the set of left eye lenses and the set of right eye lenses provided with a front lens and a rear lens, a void formed between the front lens and the rear lens and connected with the accommodation room; a microelectromechanical component positioned on the eyeglass body; a sensor positioned on the eyeglass body, electrically coupled to the microelectromechanical component, and configured to detect axial convex lengths and curvatures of corneas for the user's eyeballs and generate a control signal; and at least a pair of push units respectively arranged at upper ends of the left frame and the right frame and electrically coupled to the microelectromechanical component, wherein the microelectromechanical component controls the push units with the control signal, curvature of the set of left eye lenses and/or the set of right eye lenses is changed by the controlled push units, and flowing amount of the transparent liquid in the void within the set of left eye lenses and/or the set of right eye lenses varies corresponding to the changed curvature.

DETAILED DESCRIPTION OF THE PREFERRED EMBODIMENT

Near-sighted vision is determined by four measurement ways as follows. The curvature of cornea measured by keratometer or ophthalmomter is the first way for vision measurement. The formation of nearsighted vision is due to imaging at front of retina because of changing in curvature of cornea. The diopter measurement of human lens is the second way. A regular human lens is like a convex lens with 1200 diopter put into human eyeball. Sudden increase on diopter of nearsighted vision is mainly due to the increase of human lens diopter caused by nuclear cataract. However, so far it is difficult to measure the diopter of human lens by any equipment.

Adjusting the capacity of focusing is the third measurable way for vision. People can read book, cell phone and plate computer in a short distance with the help of ciliary muscle contraction as a convex lens. The over contraction of ciliary muscle may cause pseudomyopia, but pseudomyopia will not be discussed in following embodiments. Measurement on axial length of eye is the fourth way. When the axial length of eye gets long, the imaging will fall at front of retina to form near-sighted vision. In the present invention, one or more sensors may detect convex length and curvature of eyeball for measurement of axial length. The curvature of eyeglass lens may be adjusted in response to the variation of axial length of eye, which may be regarded as adjustment on near-sighted eyeglasses with convex lenses. Thus, with changing in the convex length and the curvature of eyeball, the curvature of lenses in the present invention is adjustable adaptive to user's vision variation and matched with user's nearsighted diopter, so that user may not replace her/his near-sighted eyeglasses of different diopter.

Figure 1A:
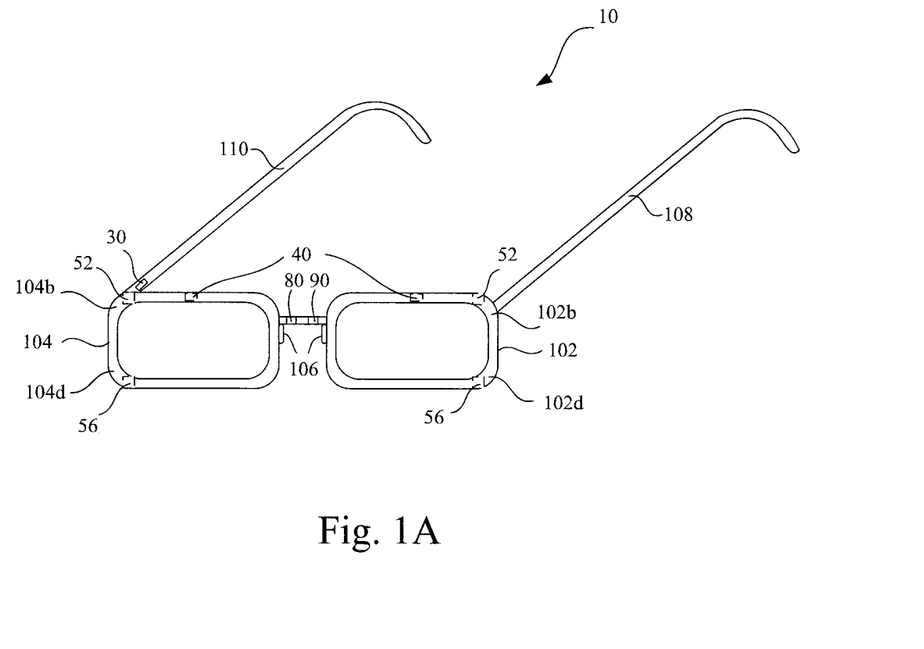
FIG. 1A is a front view diagram of illustrating a pair of intelligent assisted vision glasses in accordance with the present invention.
Figure 1B:
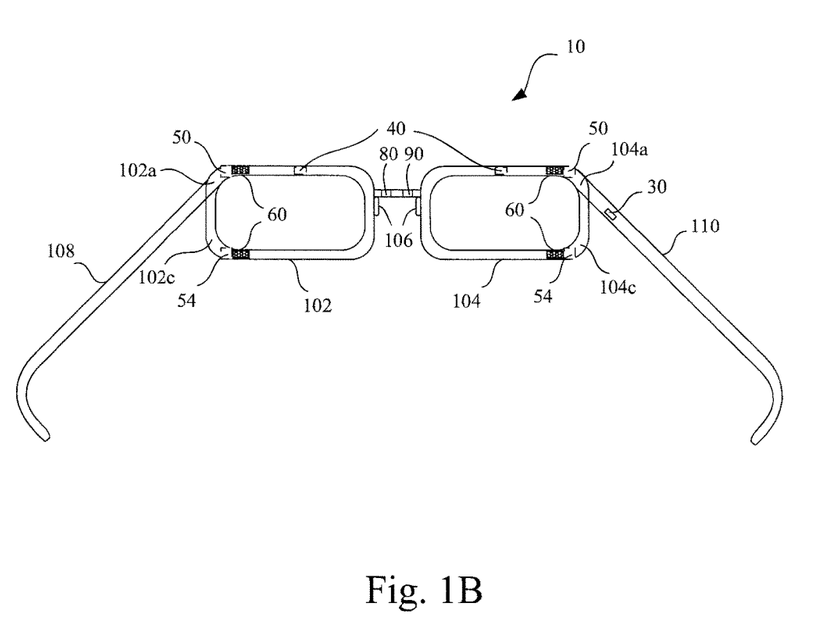
FIG. 1B is a rear view diagram of illustrating a pair of intelligent assisted vision glasses in accordance with the present invention.

First, please refer to FIG. 1A and FIG. 1B. FIG. 1A and FIG. 1B are respective a front view and a rear view diagram of illustrating an intelligent assisted vision glasses according to the present invention. In FIG. 1A and FIG. 1B, an intelligent assisted vision glasses includes an eyeglass body 10 equipped with a left frame 102, a right frame 104, a pair of nosepads 106, a left temple 108, and a right temple 110. The left temple 108 and the right temple 110 are pivotally or hinged coupled to the left frame 102 and the right frame 104, respectively. The pair of nosepads 106 is disposed between the left frame 102 and the right frame 104 and proximal to a user's nose position. It is noted that the shapes and materials of the left frame 102, the right frame 104, the pair of nosepads 106, the left temple 108, and the right temple 110 are neither limited nor discussed in the present invention.

Figure 2:
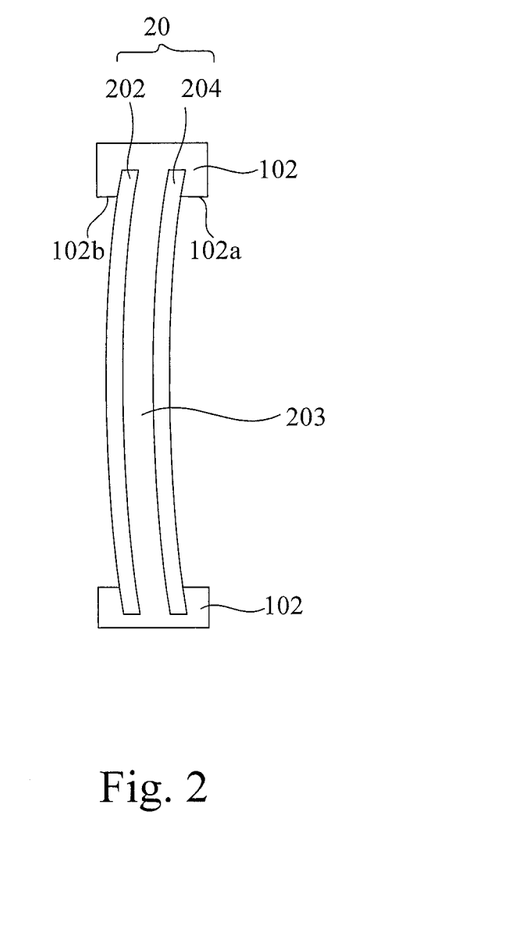
FIG. 2 is a cross-sectional view of illustrating the engagement of a set of lenses and a lens frame for a pair of intelligent assisted vision glasses in accordance with the present invention.

FIG. 2 is a cross-sectional view of illustrating the engagement of a set of left eye lenses and a left frame of a pair of intelligent assisted vision glasses shown in FIG. 1 A and FIG. 1B according to the present invention. It is understood that the structures of the set of left eye lenses 20 are same as the ones of the set of right eye lenses (not shown), thus an engagement of frame and lenses in following embodiments is illustrated with one side assembly (the left frame 102 and the set of left eye lenses 20) rather than the other side assembly (right frame 104 and the set of right eye lenses).

In FIG. 2, the set of left eye lenses 20 includes a front lens 202 and a rear lens 204. It is understood that the rear lens 204 is a lens proximal to user's face or eyeball, and the front lens 202 is a lens facing outwards. An upper end and a lower end of the front lens 202 as well as the ones of the rear lens 204 in the set of left eye lenses 20, are engaged with an upper end and a lower end of the left frame 102 of the eyeglass body 10, respectively. Moreover, there is a void 203 between the front lens 202 and the rear lens 204.

Furthermore, in an embodiment of the present invention, the lens or lenses in the set of left eye lenses 20 and the set of right eye lenses (not shown) is made of graphene because of its flexibility, transparent with optical absorption of about 2.3% and low cost. The flexibility and low optical absorption of graphene are suitable for not only energy, mechanic, medical, optoelectronic or semiconductor applications but also consumer product application, as well as the lenses in the pair of intelligent assisted vision glasses in the present invention.

Figure 3:
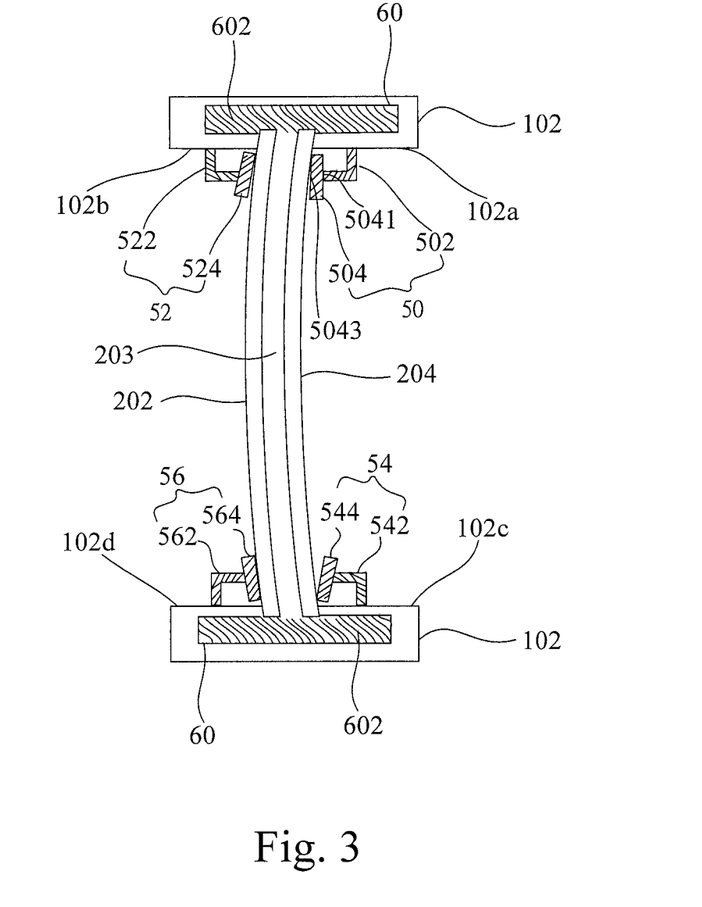
FIG. 3 is a schematic of illustrating a pair of intelligent assisted vision glasses without adjustments on curvatures and thickness of lenses in accordance with the present invention.
Figure 4:
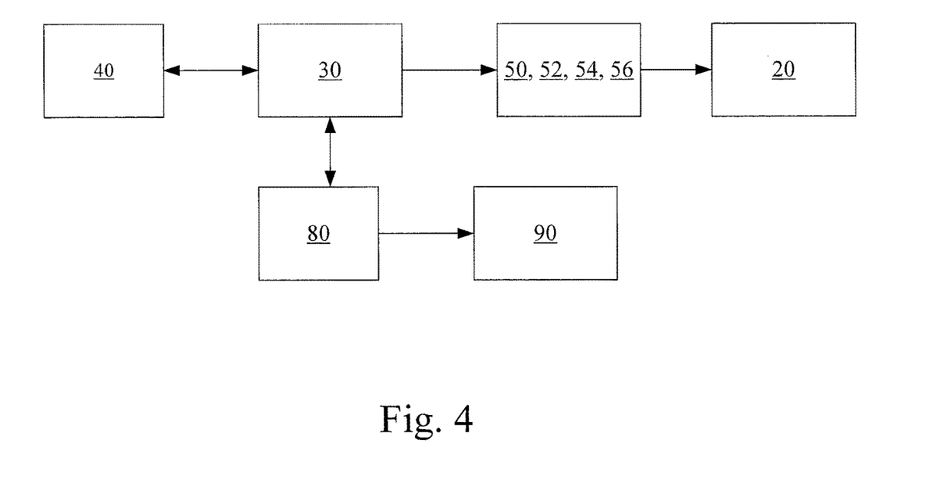
FIG. 4 is a block diagram of illustrating a pair of intelligent assisted vision glasses in accordance with the present invention.

Next, please refer to FIG. 1A and FIG. 1B, FIG. 3 and FIG. 4. FIG. 3 is a structure of illustrating a push unit on a frame. FIG. 4 is a block diagram illustrating microelectromechanical components, a sensor, a push unit and a set of left eye lenses. In FIG. 3 and FIG. 4, a microelectromechanical component 30 is electrically connected to a sensor 40 and a push unit 50 and configured to control the sensor 40 for generating control signal in response to the detection of a change in a length of human eyeball. The push unit 50 is controlled by the control signal to act on the set of left eye lenses 20 (and/or the set of right eye lenses) so as to make the curvature of the set of left eye lenses 20 (and/or the set of right eye lenses) fit the change such as a convex length or a curvature of eyeball.

The microelectromechanical component 30 may be arranged at any suitable position on the eyeglass body 10. In a preferred example, the microelectromechanical component 30 may be positioned within the left frame 102, the right frame 104, the left temple 108 or the right temple 110, but not limited in the present invention.

The sensor 40 may detect the convex length and the curvature of human eyeball. Considering a detection range for human eyeball picked by a camera of the sensor 40 (not shown), the sensor 40 is arranged between the left frame 102 and the right frame 104 and proximal to the position of the pair of nosepads 106. Alternatively, there are the sensors 40 respectively arranged at the left frame 102 and the right frame 104 (as shown in FIG. 1A and FIG. 1B). It is noted that the sensor 40 may detect the convex lengths and the curvatures of human right and left eyeballs. Thus, it is understood that the positions and numbers of the sensors 40 are adaptive to detect the whole right and left eyeballs. In the embodiments of the present invention, the sensor 40 may be an IR sensor or visual identification apparatus.

Next, push units 50, 52 are deposited at the inner side 102a (proximal to human face) and the outer side 102b (distal to human face) of the upper end of the left frame 102. The push unit 50 includes a stand 502 and a wall 504, and the push unit 52 includes a stand 522 and a wall 524. The stand 502 is pivotally coupled to the inner side 102a of the upper end of the left frame 102. One terminal 5041 of the wall 504 is pivotally coupled to the stand 502, while the other end 5043 of the wall 504 proximal to the set of left eye lenses 20 is attached to the rear lens 204 of the set of left eye lenses 20. It is also said that with the wall 504, the push unit 50 at the inner side 102a (proximal to human face) of the upper end of the left frame 102 touches the rear lens 204 of the set of left eye lenses 20, while with the wall 524, the push unit 52 at the outer side 102b (distal to human face) of the upper end of the left frame 102 touches the front lens 202 of the set of left eye lenses 20.

In other embodiments, the push units 50, 52 may be simultaneously arranged at the inner side 102a and the outer side 102b of the upper end of the left frame 102, respectively. In addition to that situation aforementioned, there are four push units 50, 52, 54 and 56 respectively deposited at the four sides of the left frame 102 for precisely adjusting the curvatures of the set of left eye lenses 20 to fit the convex length and the curvature of human eyeball. The four sides include the inner side 102a and the outer side 102b of the upper end of the left frame 102, and an inner side 102c and an outer 102d of the lower end of the left frame 102. The four push units 50, 52, 54 and 56 may precisely adjust the curvatures of the front lens 202 and the rear lens 204 for the whole set of left eye lenses 20. Similarly, shown in FIG. 3, push units 54, 56 include stands 542, 562 and walls 544, 564, respectively, and have functions same as the ones of the push units 50, 52 to not repeat to describe here. Moreover, the push units 50, 52, 54 and 56 with respect to the right frame 104 and the set of right eye lenses are similar to the left frame 102 and the set of left eye lenses 20. The push units 50, 52 may be simultaneously arranged at an inner side 104a and an outer side 104b of the upper end of the right frame 104, respectively. The other push units 54, 56 may be simultaneously arranged at an inner side 104c and an outer 104d of the lower end of the right frame 104, shown in FIG. 1A and FIG. 1B.

Moreover, the left frame 102 may include an accommodation room 60 with transparent liquid 602 in a frame body of the left frame 102. Two accommodation rooms 60 are arranged respectively at upper inner sides 102a and lower inner sides 102c of the left frame 102 and another two accommodation rooms 60 are arranged respectively at upper inner sides 104a and lower inner sides 104c of the right frame 104, shown in FIG. 1A, FIG. 1B, and FIG. 3. In the embodiment, the refractive index of the transparent liquid 602 is similar as the ones of graphene, such as 2.6-3.0. The transparent liquid 602 is nonvolatile, toxic-free, and non-corrosive inert solution, such as silicon dioxide solution, phenyl silicone oil or titanium dioxide solution, to ensure there is no chemical reaction between the transparent liquid 602 and the lenses (202, 204) made of graphene. Besides, there is no difference in refractive indices of the transparent liquid 602 and the lenses (202, 204). The difference in refractive indices may make human eyes fail in focusing or normally sighting because of blurred vision.

Figure 5:
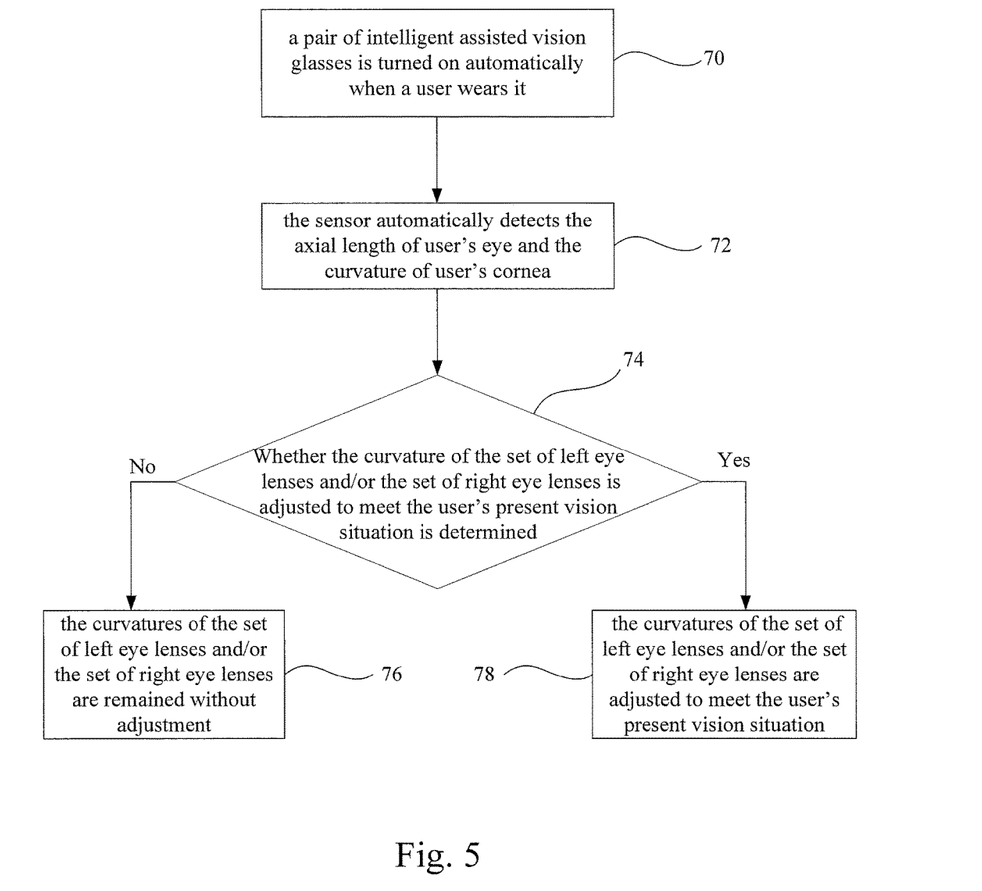
FIG. 5 is a flow chart of illustrating a pair of intelligent assisted vision glasses to do adjustments on curvatures and thickness of lenses adaptive to user's vision condition in accordance with the present invention.

Next, please refer to FIG. 5 and FIG. 4 together. FIG. 5 is a flow chart of illustrating a pair of intelligent assisted vision glasses acting on the adjustment of curvatures and thicknesses of sets of lenses according to user's vision situation. In FIG. 5, step 70: the pair of intelligent assisted vision glasses is turned on automatically when a user wears it. In step 70, its turn-on time may be preset about 2-5 seconds or others set by the user. Step 72: the sensor automatically detects the axial length of user's eye and the curvature of user's cornea. In step 72, after the pair of intelligent assisted vision glasses turns on and the microelectromechanical component 30 is ready, the sensor 20 on the eyeglass body 10 detects the axial lengths of eyes and the curvatures of user's corneas for user's left and right eyeballs, and then the detected results is/are returned to the microelectromechanical component 30 for generating control signal. Step 74: whether the curvature of the set of left eye lenses and/or the set of right eye lenses is adjusted to meet the user's present vision situation is determined. In step 74, the situation aforementioned is judged by the microelectromechanical component 30 according to the sensed axial lengths of the eyes and the sensed curvatures of corneas. Step 78 will proceed provided that the axial length of eye and the curvature of cornea for the left and/or right eyeball change. Step 78: the curvatures of the set of left eye lenses and/or the set of right eye lenses are adjusted to meet the user's present vision situation. In step 78, the microelectromechanical component 30 controls the push units 50, 52, 54 and 56 according to the control signal to further adjust the curvatures of the lenses of the set of left eye lenses and/or the set of right eye lenses. Step 76 will proceed provided that it is not necessary to adjust the curvatures of the set of left eye lenses and/or the set of right eye lenses. In step 76, the curvatures of the set of left eye lenses and/or the set of right eye lenses are remained without adjustment.

Figure 6:
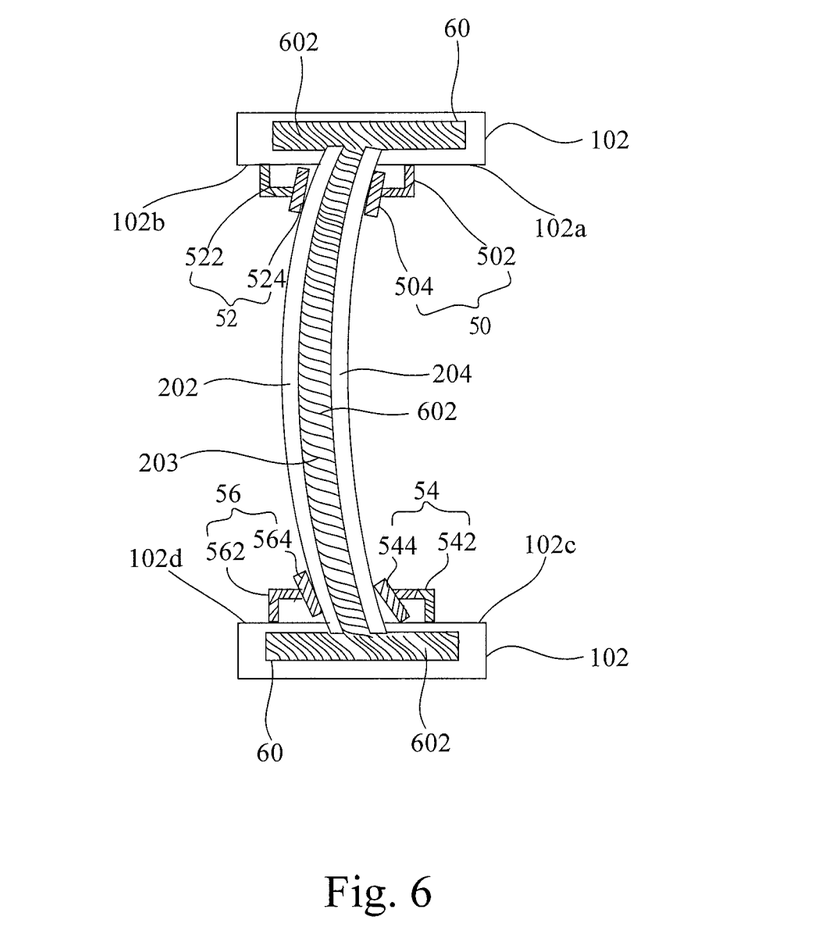
FIG. 6 is a schematic of illustrating a pair of intelligent assisted vision glasses to do adjustments on curvatures and thickness of lenses adaptive to user's vision condition in accordance with the present invention.

Next, how the pair of intelligent assisted vision glasses does adjustments on curvatures and thickness of lenses adaptive to user's vision condition according to the flow chart in FIG. 5 is illustrated. FIG. 6 is a schematic of illustrating a pair of intelligent assisted vision glasses acting on the adjustment of curvatures and thicknesses of sets of lenses according to user's vision situation. In FIG. 6, when a user wears the pair of intelligent assisted vision glasses of the present invention, the pair of intelligent assisted vision glasses may be turned on by the user or automatically by self-sensing. Next, the sensor 40 controlled by a microelectromechanical component 30 senses the axial lengths of eyes and the curvatures of corneas for user's left and right eyeballs. For the pair of intelligent assisted vision glasses, the front lens 202 and the rear lens 204 of the set of left eye lenses 20 are attached tightly to each other, as well as the front lens and the rear lens of the set of right eye lenses. The front lens and the rear lens are directly attached or mounted tightly without anything intervened between them rather than by using adhesive agent. It is noted that the separation configuration for the front lens 202 and the rear lens 204 of the set of left eye lenses 20 shown in drawings is just for illustrating the two lenses mad of graphene of the set of left eye lenses 20. In practice, the void between the two lenses is not as big as one shown in drawings.

Compared with the axial lengths of eyes and the curvatures of corneas for normal eyeballs without near-sightness, in the case that the axial lengths of eyes and the curvatures of corneas for the user's left and right eyeballs change is sensed by the sensor 20, the microelectromechanical component 30 may generate the control signal according to the variation of the axial lengths of eyes and the curvatures of corneas for the user's left and right eyeballs. With the control signal, the microelectromechanical component 30 controls the push units 50, 52, 54 and 56 on the left frame 102 and the right frame 104 to drive the stands 502, 522, 542 and 562. Then the driven stands 502, 522, 542 and 562 move forwards to push the walls 504, 524, 544 and 564, respectively. The pushed walls 504, 524, 544 and 564 move towards the direction of the lenses to press the lenses closer, or release the front lens 202 and rear lens 204 so that the front lens 202 and rear lens 204 move backwards to separate each other. The separating movement of the front lens 202 and the rear lens 204 from the state of tight attachment can result in the generation of void 203 between them, and the void 203 connects with an accommodation room 60 full of transparent liquid 602. To avoid the mismatching of refractive indexes between air in the void 203 and graphene to make the user's eyes uncomfortable, the accommodation room 60 may be opened by the microelectromechanical component 30 to let the transparent liquid 602 flow from the accommodation room 60 to the void 203 between the front lens 202 and the rear lens 204. Consequently, the thickness enhancement of lenses is achieved by filling up the void 203 with the transparent liquid 602 that has similar refractive index as the lenses. While the front lens 202 and the rear lens 204 are pressed to move towards each other, the thickness of the void 203 between them will reduce and the transparent liquid 602 in the void 203 will flow back to the accommodation room 60.

Figure 7:
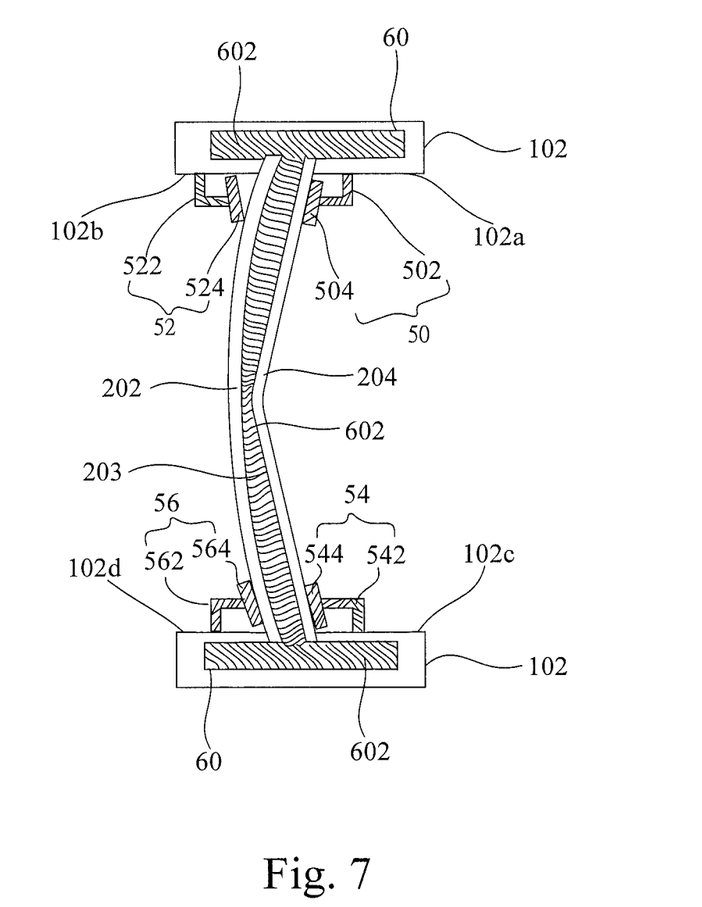
FIG. 7 is a schematic of illustrating a pair of intelligent assisted vision glasses to do adjustments on curvatures and thicknesses of lenses adaptive to user's near-sighted or heavy diopter condition in accordance with the present invention.

In the embodiments of the present invention, provided that little bias from normal vision for the axial length of eye and the curvature of cornea for eyeball (slight nearsighted) is sensed by the sensor 40, there is also little adjustment on the lenses by the microelectromechanical component 30 for the push units 50, 52, 54 and 56, such as little-changing curvatures for the front lens 202 and the rear lens 204 as shown in FIG. 6. However, provided that more serious bias from normal vision for the axial length of eye and the curvature of cornea for eyeball (serious near-sighted) is sensed by the sensor 40, the front lens 202 and the rear lens 204 will be controlled by the push units 50, 52, 54 and 56 to have the bigger curvatures, and the void 203 between the front lens 202 and the rear lens 204 becomes bigger, too. Consequently, the thickness enhancement of lenses is achieved because the transparent liquid 602 flows from the accommodation room 60 to the void 203 between the rear lens 204 and the front lens 202, shown in FIG. 7.

Moreover, the pair of intelligent assisted vision glasses of the present invention further includes reminder function to remind user of moderate rest for eyes in overusing, shown in FIG. 4. In FIG. 4, the pair of intelligent assisted vision glasses further includes a vision identification device 80 and an alarm device 90. The microelectromechanical component 30 electrically couples the vision identification device 80 and the alarm device 90, respectively, and the vision identification device 80 and the alarm device 90 are respectively arranged within the eyeglass body 10 (as shown in FIG. 1A and FIG. 1B).

Generally, once user reads books or watches television, cellar phone or plate computer with a short distance for a long period, the lens of eyeball will be more and more convex with increase of time in use of eye. When a user wears the pair of intelligent assisted vision glasses, the vision identification device 80 may detect the convex degree of the lens of user's eyeball first. Once the detected convex degree of the lens of user's eyeball bigger than the ones at the beginning of detection is detected, the vision identification device 80 transfers detected convex variation and the period of convex for the lens of user's eyeball to the microelectromechanical component 30, and then the microelectromechanical component 30 may remind the use of moderate rest for eye fatigue by transferring alarm signal to the alarm device 90. In the embodiments, the alarm device 90 may be LED light, buzzer or a shake device. Accordingly, the intelligent assisted vision glasses may remind user of moderate rest to avoid fatigue, overuse, nearsighted condition, diopter increase or disease of the eye by flash light, audio or shake signal.

Alternatively, in other embodiments of the present invention, to avoid eye injure by UV light or sunlight radiation, the surface of the lenses made of graphene may be coated a layer of anti-UV coating for eye protection.

Accordingly, the pair of intelligent assisted vision glasses of the present invention may dynamically adjust the curvatures of the lenses in response to the detected axial length of eye and curvature of cornea for user's eyeball by the sensor to meet user's eye condition like a regular near-sighted eye glasses.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A pair of intelligent assisted vision glasses, including an eyeglass body provided with a left frame, a right frame, a pair of nosepads, a left temple and a right temple, the pair of nosepads arranged between the left frame and the right frame and respectively pivotally connected to the left frame and the right frame, the left temple pivotally connected to the left frame, and the right frame pivotally connected to the right temple, which is characterized in:

two accommodation rooms arranged respectively at upper inner sides and lower inner sides of the left frame and two accommodation rooms arranged respectively at upper inner sides and lower inner sides of the right frame;

transparent liquid within each of the accommodation rooms;

a set of left eye lenses engaged with the left frame and a set of right eye lenses engaged with the right frame, each of both the set of left eye lenses and the set of right eye lenses provided with a front lens and a rear lens, a void formed between the front lens and the rear lens and connected with each of the accommodation rooms;

a microelectromechanical component positioned on the eyeglass body;

a sensor positioned on the eyeglass body, electrically coupled to the microelectromechanical component, and configured to detect axial convex lengths and curvatures of corneas for user's eyeballs and generate a control signal; and a pair of push units respectively arranged at upper ends of the left frame with one push unit in contact with a front lens and one push unit in contact with a rear lens, and a pair of push units respectively arranged at upper ends of the right frame with one push unit in contact with a front lens and one push unit in contact with a rear lens, and each pair of push units is electrically coupled to the microelectromechanical component, wherein the microelectromechanical component in response to the detections from the sensor, controls the push units with the control signal to push the front lens and the rear lens of the set of left eye lenses and/or the set of right eye lenses to move towards/backwards to approach/separate from each other, whereby curvature of the set of left eye lenses and/or the set of right eye lenses is changed by the controlled push units, and flowing amount of the transparent liquid in the void within the set of left eye lenses and/or the set of right eye lenses varies corresponding to the changed curvature.

2. The pair of intelligent assisted vision glasses according to claim 1, wherein the transparent liquid is silicon dioxide solution, phenyl silicone oil or titanium dioxide solution.

3. The pair of intelligent assisted vision glasses according to claim 1, wherein a refractive index of the transparent liquid is identical to both the set of left eye lenses and the set of right eye lenses.

4. The pair of intelligent assisted vision glasses according to claim 1, wherein the set of left eye lenses and the set of right eye lenses is made of graphene.

5. The pair of intelligent assisted vision glasses according to claim 1, wherein a surface of the set of left eye lenses and the set of right eye lenses is coated with a layer of anti-UV coating.

6. The pair of intelligent assisted vision glasses according to claim 1, wherein the sensor is an IR sensor.

7. The intelligent assisted vision glasses according to claim 1, further comprising an alarm device arranged on the eyeglass body.

8. The pair of intelligent assisted vision glasses according to claim 7, wherein the alarm device is a LED light, a buzzer or a shaking device.

9. The pair of intelligent assisted vision glasses according to claim 1, further comprising a pair of push units arranged at lower ends of the left frame and a pair of push units arranged at lower end of the right frame.

10. The pair of intelligent assisted vision glasses according to claim 1, further comprising a vision identification device arranged on the eyeglass body.

* * * * *